United States Patent Office
3,704,215
Patented Nov. 28, 1972

3,704,215
PROCESS FOR THE PRODUCTION OF BENZOYL CHLORIDE AND BENZOTRICHLORIDE USING LIGHT
Walter Böckmann, Krefeld-Uedingen, Germany, assignor to Farbenfabriken Bayer Aktiengesellschaft, Leverkusen, Germany
No Drawing. Filed Feb. 6, 1970, Ser. No. 9,444
Claims priority, application Germany, Feb. 26, 1969, P 19 09 523.9
Int. Cl. B01j 1/10
U.S. Cl. 204—163 R        1 Claim

ABSTRACT OF THE DISCLOSURE

Dibenzyl ether which is a by-product of the alkaline hydrolysis of benzylchloride to benzyl alcohol is subjected to the usual conditions for the chlorination of side chains of alkyl-substituted aromatic hydrocarbons yielding benzoyl chloride and benzotrichloride which are useful compounds for the production of benzaldehyde and benzoic acid respectively.

The invention relates to a technically advantageous process for the production of benzoyl chloride and benzotrichloride.

It has been found that the dibenzyl ether which is obtained in an amount of up to about 10% in the alkaline hydrolysis of benzyl chloride to form benzyl alcohol and for which immediate technical uses exist only to a limited extent, is split under the usual conditions for the chlorination of side chains of alkyl-substituted aromatic hydrocarbons, i.e., for example, of toluene, in a smooth reaction to give a mixture of benzoyl chloride and benzotrichloride.

The object of the invention, therefore, is a process for the production of benzoyl chloride and benzotrichloride, which comprises subjecting dibenzyl ether to the usual conditions for the chlorination of side chains of alkyl-substituted aromatic hydrocarbons.

The process is not limited to the reaction of pure dibenzyl ether; it can also be applied to the residue which results from the distillation of the benzyl alcohol obtained in the industrial hydrolysis of benzyl chloride to form benzyl alcohol and which contains residual amounts of benzyl alcohol as well as smaller proportions of benzaldehyde, dibenzyl and some unknown impurities, for these proportions of benzyl alcohol, benzaldehyde and dibenzyl are converted under the reaction conditions into benzoyl chloride or benzotrichloride, partly via intermediate stages.

The usual conditions for the chlorination of side chains of alkyl-substituted hydrocarbons consist, as is known, in the reaction of chlorine on the hydrocarbons, optionally at an elevated temperature, preferably at about 100° to about 150° C., and optionally under irradiation with light.

EXAMPLES (1)

40 g. chlorine per hour are introduced at 140° to 150° C. for 9 hours into 400 g. of pure dibenzyl ether under the influence of light (high pressure mercury vapour lamp). The reaction mixture then contains 46.9 percent by weight benzoyl chloride and 51.2 percent by weight benzotrichloride.

(2)

The procedure of Example 1 is followed, but with the use of a mixture of 360 g. of pure dibenzyl ether and 40 g. of pure benzyl alcohol as starting material. After chlorination, the reaction mixture contains 48.3 percent by weight benzoyl chloride and 49.2 percent by weight benzotrichloride.

(3)

400 g. of crude dibenzyl ether consisting of 95 percent by weight dibenzyl ether and 5 percent by weight of benzyl alcohol, benzyl benzoate, benzil, dibenzyl and other impurities, are chlorinated as described in Example 1. The reaction mixture then contains 49.9 percent by weight benzoyl chloride and 46.7 percent by weight benzotrichloride.

(4)

In lead-coated containers of 9 m.$^3$ capacity, about 30 m.$^3$ chlorine per hour are introduced in the course of 100 hours at 100° to 150° C. into 4 tons of crude dibenzyl ether under the influence of light. The reaction product consists of 47.7 percent by weight benzoyl chloride, 51.7 percent by weight benzotrichloride, 0.2 percent by weight benzal chloride and 0.1 percent by weight benzaldehyde, the remainder being some unknown impurities.

I claim:
1. A process for producing benzoyl chloride and benzotrichloride which comprises introducing chlorine into dibenzyl ether at a temperature of from about 100 to about 150° C. under irradiation with light and recovering resulting benzoyl chloride and benzotrichloride.

References Cited
UNITED STATES PATENTS 2,695,873  11/1954  Loverde _____ 204—163
2,810,688  10/1957  Ivins et al. _____ 204—163
2,811,485  10/1957  Evans _____ 204—163 X BENJAMIN R. PADGETT, Primary Examiner